United States Patent
Sasaki et al.

(12)

(10) Patent No.: US 6,383,983 B1
(45) Date of Patent: May 7, 2002

(54) POROUS POLYESTER FILM AND THERMAL TRANSFER IMAGE-RECEIVING SHEET

(75) Inventors: Yasushi Sasaki; Koji Yamada; Toshitake Suzuki, all of Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/467,864

(22) Filed: Dec. 20, 1999

Related U.S. Application Data

(62) Division of application No. 09/093,457, filed on Jun. 8, 1998, now Pat. No. 6,096,684.

(30) Foreign Application Priority Data

| Jun. 9, 1997 | (JP) | 9-151230 |
| Jul. 14, 1997 | (JP) | 9-187978 |
| Jan. 6, 1998 | (JP) | 10-000877 |
| Feb. 25, 1998 | (JP) | 10-043856 |

(51) Int. Cl.⁷ .................... B41M 5/035; B41M 5/38
(52) U.S. Cl. .................... 503/227; 428/304.4; 428/409; 428/480; 428/913; 428/914
(58) Field of Search .................... 8/471; 428/195, 428/304.4, 323, 327, 480, 913, 914, 409; 503/227

(56) References Cited

U.S. PATENT DOCUMENTS

| 4,897,377 A | 1/1990 | Marbrow |
| 5,422,175 A | 6/1995 | Ito et al. |
| 5,856,010 A * | 1/1999 | Furuya et al. ............... 428/407 |

FOREIGN PATENT DOCUMENTS

| EP | 0 283048 | 9/1988 |
| EP | 0322771 | 7/1989 |
| EP | 0 451 797 | 10/1991 |
| EP | 0 522 740 | 1/1993 |
| EP | 0 672 536 | 9/1995 |
| EP | 0 688 814 | 12/1995 |
| JP | 2-29438 | 1/1990 |
| WO | 96/19354 | 6/1996 |

* cited by examiner

Primary Examiner—Bruce H. Hess
(74) Attorney, Agent, or Firm—Leydig, Voit & Mayer, Ltd.

(57) ABSTRACT

A porous polyester film having an apparent specific gravity of not more than 1.3, which comprises a polyester film having many voids (layer (A)) comprising a polyester and a thermoplastic resin incompatible with said polyester, and a polyester film having many fine voids (layer (B)) comprising a polyester and inorganic fine particles having an average particle size of not more than 1 μm, the two layers being bonded to each other, wherein the layer (B) has a porosity of not less than 20% by volume, and a thickness of 1–20 μm that is not more than 30% of the thickness of the porous film. Due to the present invention, a porous polyester film capable of providing an image-receiving sheet superior in surface smoothness, image density, and resistance to wrinkles can be provided.

12 Claims, No Drawings

POROUS POLYESTER FILM AND THERMAL TRANSFER IMAGE-RECEIVING SHEET

This is a divisional of application(s) Ser. No. 09/093,457, filed on Jun. 8, 1998, now U.S. Pat. No. 6,096,684.

TECHNICAL FIELD OF THE INVENTION

The present invention relates to a porous polyester film. More particularly, the present invention relates to a porous polyester film, which is suitable as a substrate of a thermal transfer image-receiving sheet. The present invention moreover relates to a thermal transfer image-receiving sheet obtained from this polyester film.

BACKGROUND OF THE INVENTION

Conventionally known thermal transfer image-receiving sheets include natural paper with or without a recording layer formed on its surface. They are poor in surface smoothness. Thus, a recording layer is formed on a thin polypropylene synthetic paper adhered to a natural paper or a thick polypropylene synthetic paper, for an improved smoothness of an image-receiving sheet. This is because polypropylene synthetic paper has, in addition to an adequate cushioning property, surface smoothness that cannot be achieved by natural paper. The adequate cushioning property enables uniform and sufficient contact between heating head/transcription ribbon/image-receiving sheet during thermal transfer, thus resulting in uniform and highly dense printing. When a polypropylene synthetic paper is used as a substrate, however, the image-receiving sheet is susceptible to plastic deformation, and poor flexibility thereof produces wrinkles on its surface even when the image-receiving paper is only slightly bent. This profoundly impairs the grade of the printed matter.

In addition, a method using a porous polyester film instead of polypropylene synthetic paper has been proposed. Nevertheless, a porous polyester film generally has a greater rigidity and less cushioning property than does polypropylene synthetic paper. To achieve the same image density as polypropylene synthetic paper with a porous polyester film, the porosity needs to be made higher than that of polypropylene synthetic paper. Consequently, void size becomes markedly greater to impair surface smoothness or produce wrinkles on the surface. When the porosity becomes greater, moreover, polyester becomes unstable during production, thereby making stable production at industrial scale extremely difficult.

The currently most effective method to obtain a film having functions similar to those of natural paper, from a polyester resin as a main starting material, is as follows. That is, a multitude of fine voids are formed inside a polyester resin film. The voids give adequate flexibility to the film, reduce weight of the film and afford superior writability and vivid printing/transcription effect. The voids are formed in the film by mixing a resin incompatible with the polyester resin with a staring material polyester resin as a void-forming agent, processing the mixture to give a film and stretching the film to create voids in the interface between resins.

As the void-forming agent, proposed are polyolefin resin such as polypropylene resin and polymethylpentene resin (Japanese Patent Unexamined Publication No. 34755/1974), polystyrene resin (Japanese Patent Examined Publication Nos. 2016/1974 and 29550/1949) and the like.

Of these, polyolefin resin, particularly polymethylpentene, has superior void-forming capability and is very superior in reducing the weight of the film. On the other hand, it has poor compatibility with polyester, and said void-forming agent is dispersed as crude particles in polyester. Consequently, the size of the void also becomes greater and the greater void size combined with the nerve of the polyester causes vastly decreased flexibility of the film. This problem becomes prominent during the production and processing of the film or handling of the final product such as a printed matter. For example, when the film is slightly bent, it is easily folded or wrinkles are developed on the film surface. Flexibility is one of the most advantageous properties of synthetic resin film, and the loss of this property is fatal for the film.

On the other hand, polystyrene resin can be used to form a number of fine voids because it has a low degree of incompatibility with polyester resin as compared to polyolefin resin. The low degree of incompatibility allows fine dispersion of a void-forming agent. This in turn makes it possible to minimize degradation of flexibility of the film which has been a fatal defect of polyolefin resin. However, the void-forming agent tends to collapse in the direction of film thickness during stretching of the film. Consequently, sufficient growth of voids is prevented and the film cannot be lightweight.

Some methods have been proposed to maintain superior void-forming capability of the polyolefin resin and to improve dispersion of the agents in the polyester. For example, Japanese Patent Examined Publication No. 17779/1995 proposes addition of surfactant to polyester, Japanese Patent Unexamined Publication No. 235942/1990 proposes addition of polyethylene glycol and Japanese Patent Unexamined Publication No. 264141/1992 proposes addition of polyether ester copolymer.

Fine dispersion of polyolefin resin by these methods can be achieved only to a certain extent and fine dispersion as achieved by polystyrene resin is nearly impossible to achieve. Stable fine dispersion cannot be afforded without damage to other properties such as strength of the film and whiteness thereof.

In other words, a method based on the addition of surfactant is associated with inevitable denaturing that occurs in a melt line due to insufficient heat resistance of the surfactant, and stable dispersion effect cannot be achieved.

The method comprising addition of a polyether resin is associated with decomposition of polyether during drying or in melt line of the resin or recycling of film waste, since polyether is extremely susceptible to degradation by heat. The decomposition of polyether not only brings about inconsistent fine dispersion of polyolefin resin, but also poses problems. The problems include, for example, lower molecular weight of polyester and thereby caused lower film strength, yellowing of the film, pungent smell due to the generation of aldehyde and the like.

Thus, a heat-resistant porous polyester film having both superior void-forming capability of polyolefin resin, particularly polymethylpentene, and superior flexibility of polystyrene resin is not in existence in the prior art technology.

SUMMARY OF THE INVENTION

It is therefore an object of the invention to provide a porous polyester film capable of providing an image-receiving sheet superior in surface smoothness, image density, and resistance to wrinkles.

The present invention also aims at providing an image-receiving sheet obtained from the above-mentioned polyester film.

The present invention further aims at providing a porous polyester film as mentioned above, which is lightweight and flexible and which has superior heat resistance.

Accordingly, the present invention provides the following polyester films and thermal transfer image-receiving sheets made from said films.

(1) A porous polyester film having an apparent specific gravity of not more than 1.3, which comprises a polyester film having voids (layer A) comprising a polyester and a thermoplastic resin incompatible with said polyester, and a polyester film having many fine voids (layer B) comprising a polyester and inorganic fine particles having an avenge particle size of not more than 1 $\mu$m, the two layers being bonded to each other, wherein the layer (B) has a porosity of not less than 20% by volume and a thickness of 1–20 $\mu$m that is not more than 30% of an entire thickness of the porous film.

(2) A porous polyester film obtained by subjecting a polymer mixture of a polyester and a thermoplastic resin incompatible with said polyester to biaxial orientation and heat treatment, wherein said thermoplastic resin incompatible with said polyester comprises polystyrene resin, polymethylpentene resin and polypropylene resin, and a polystyrene resin content (X wt %) and polymethylpentene resin content (Y wt %) and polypropylene resin content (Z wt %) satisfy the following equations:

$$0.01 \leq X/(Y+Z) \leq 1$$

$$Z/Y \leq 1$$

$$3 \leq X+Y+Z \leq 30.$$

(3) A porous polyester film, comprising a polyester and a thermoplastic resin incompatible with said polyester, the film having an apparent specific gravity of not more than 1.3, one of the surfaces having a cohesive failure index of not more than 3 and a surface gloss of not less than 20%.

(4) A porous polyester film, comprising a polyester and a thermoplastic resin incompatible with said polyester, the film having an apparent specific gravity of not more than 1.3, a dynamic hardness of one of its surfaces of not more than 5.0 and a surface gloss of not less than 20%.

DETAILED DESCRIPTION OF THE INVENTION

Layer (A)
Polyester

In the present invention, the polyester is produced by condensation polymerization of an aromatic dicarboxylic acid (e.g., terephthalic acid, isophthalic acid and naphthalenedicarboxylic acid) or an ester thereof and glycol (e.g., ethylene glycol, diethylene glycol, 1,4butanediol and neopentyl glycol). These polyesters can be produced by directly reacting an aromatic dicarboxylic acid and glycol, or by ester interchange of alkyl ester of aromatic dicarboxylic acid and glycol, followed by condensation polymerization, condensation polymerization of diglycol ester of aromatic dicarboxylic acid, or other method. Examples of such polyester include poly(ethylene terephthalate), poly(butyrene terephthalate), poly(ethylene-2,6naphthalate) and the like. These polyesters may be homopolymer or copolymer with a third component. In any case, a polyester comprising an ethylene terephthalate unit, butylene terephthalate unit or ethylene-2,6naphthalate unit in a proportion of not less than 70 mol %, preferably not less than 80 mol %, and more preferably not less than 90 mol %, is preferably used in the present invention.

Resin Incompatible with Polyester

The thermoplastic resin incompatible with polyester to be used in the present invention (also referred to as void-forming agent) is optional and is not limited as long as it is incompatible with polyester. Specific examples include polystyrene resin, polyolefin resin, polyacrylic resin, polycarbonate resin, polysulfone resin, cellulose resin and the like. In particular, polystyrene resin and polyolefin resin, such as polymethylpentene and polypropylene, are preferably used.

More preferable thermoplastic resin incompatible with polyester is a mixture of a polystyrene resin and polyolefin resin such as polymethylpentene resin and polypropylene resin. When polypropylene resin alone is used as a polyolefin resin, the film cannot reduce much weight. On the other hand, when polymethylpentene resin alone is used as a polyolefin resin, it is rather easy to reduce weight of the film. However, variable dispersion of polymethylpentene resin in the film creates an uneven pattern like a canvas cloth on the film surface. When the polystyrene resin content is greater than that of polymethylpentene resin, such unevenness can be drastically reduced to a practical level. In this case, however, the weight of the film cannot be reduced.

In the present invention, polymethylpentene resin and polypropylene resin are concurrently used as a polyolefin resin component to form a porous polyester film. In consequence, the film of the present invention can be uniform and lightweight to the level comparable to a film prepared using a polymethylpentene resin as a polyolefin resin.

When polystyrene alone is used as a void-forming agent, the film has superior flexibility, but cannot be lightweight as compared to a film obtained using polyolefin resin as a void-forming agent.

It is preferable that the polystyrene resin content (X wt %), polymethylpentene resin content (Y wt %) and polypropylene resin content (Z wt %) are adjusted to satisfy $0.01 \leq X/(Y+Z) \leq 1$ and $Z/Y \leq 1$, the lower limit of X+Y+Z being 3, upper limit thereof being 30. When these conditions are met, greater porosity can be achieved and resistance to wrinkles can be improved.

When a polystyrene resin and a specific polyolefin resin are used at a specific mixing ratio, as mentioned above, a lightweight and flexible porous polyester film superior in heat resistance can be obtained.

When X wt %, Y wt % and Z wt % satisfy the relation as expressed by $0.01 \leq X/(Y+Z) \leq 1$, a void-forming agent can be finely dispersed in a film and the film becomes lightweight and flexible. When the polystyrene resin content is less than the above, polyolefin resin (polypropylene resin and polymethylpentene resin) cannot be fully dispersed in the polystyrene resin, and unevenness and less flexibility may pose problems. When the polystyrene resin content exceeds the above range, the film may not be sufficiently lightweight.

While the polystyrene resin content can be optionally adjusted within the above-mentioned range, the range as expressed by $0.1 \leq X/(Y+Z) \leq 0.5$ is preferable. In this range of the polystyrene resin, the weight can be reduced easily.

The mixing ratio (Z/Y) of polypropylene resin to polymethylpentene resin is preferably $0.01 \leq Z/Y \leq 1$, particularly preferably $0.1 \leq Z/Y \leq 0.5$. Addition of a small amount of polypropylene resin suffices for achieving the desired effects. Conversely, when it exceeds 1, polymethylpentene resin cannot be made lightweight.

The lower limit of X+Y+Z is more preferably 5, and most preferably 8. On the other hand, the upper limit is more preferably 20, most preferably 18, particularly preferably 16. Especially, the ratio of $5 \leq X+Y+Z \leq 30$ can achieve lightweight of the film and superior uniformity. The ratio within $3 \leq X+Y+Z \leq 20$ leads to markedly superior surface smoothness.

As used herein, polystyrene resin means a thermoplastic resin having a polystyrene structure as a basic constituent unit, and includes homopolymers such as atactic polystyrene, syndiotactic polystyrene, isotactic polystyrene and the like, modified resin wherein other components have been graft- or block-copolymerized (e.g., impact resistant polystyrene resin and modified polyphenylene ether resin) and mixtures of thermoplastic resin having compatibility with these polystyrene resins (e.g., polyphenylene ether) and polystyrene.

The polymethylpentene resin is a polymer having a unit derived from 4-methylpentene-1 in a proportion of not less than 80 mol %, preferably not less than 90 mol %. Other components are exemplified by ethylene unit, propylene unit, butene-1 unit, 3-methylbutene-1 unit and the like.

This polymethylpentene has a melt flow rate of not more than 200 g/10 min, more preferably not more than 30 g/10 min. When it exceeds 200 g/10 min, it is difficult to produce a lightweight film.

The polypropylene resin in the present invention also includes homopolymers, such as isotactic polypropylene and syndiotactic polypropylene, and modified resins by graft- or block-copolymerization with other components.

The above-mentioned polypropylene resin may be used in admixture with a polymethylpentene resin, or as a copolymer comprising a propylene unit introduced into the polymethylpentene resin.

The mixing percentage of the thermoplastic resin relative to polyester differs depending on a desired amount of voids. It is preferably 3–20 wt % of the film as a whole. It is more preferably 5–20 wt %, particularly 5–18 wt %, and most preferably 8–16 wt %. When it is less than 3 wt %, the amount of voids cannot be increased to a desired level. When it exceeds 20 wt %, the film is caused to have poor stretch property, lower heat resistance and less strength and nerve.

Where necessary, inorganic or organic particles may be added to film (A) via polyester or thermoplastic resin incompatible with polyester, to improve opacifying power. Examples of the particles include, but not limited to, silica, kaolinite, talc, calcium carbonate, zeolite, alumina, barium sulfate, carbon black, zinc oxide, titanium oxide, zinc sulfide, organic white pigment and the like.

The thermoplastic resin incompatible with polyester may be used concurrently with other resins. The resin that can be added include, but not limited to, polyphenylene ether resin, polyacrylic resin, polycarbonate resin, polysulfone resin, cellulose resin, polyphenylene sulfide resin, cyclic olefin polymer and ring opening polymerization produce thereof.

Layer (B)

The porous polyester film of the present invention consists of the above-mentioned constituent components. It may have a single layer structure or a multi-layer structure of two or more layers. However, it is preferable that it comprise polyester film (B) (skin layer) substantially free of polyolefin resin, on at least one surface of polyester film (A), particularly preferably on both surfaces thereof. This structure advantageously and effectively prevents bleeding of polyolefin resin to a film surface layer. This bleeding stains production devices and causes contamination in the process. It is also preferable to form layer (B) to afford a multi-layer structure, since it adds a characteristic function to the surface of the final film product.

The polyester to be used for layer (B) is the same as the polyester to be used for layer (A).

The voids of layer (B) can be formed by adding particles. In particular, polyester film (B) having fine voids due to fine particles having an average particle size of not more than 5 $\mu$m, preferably not more than 1 $\mu$m particularly due to inorganic particles having an average particle size of less than 1 $\mu$m, is adhered to the surface of polyester film (A).

In the prior art technology, it has been a common understanding that, when polyester layer (B) is formed on the surface of the layer (A) containing voids, image density may decrease by thermal transfer printing, but never increases. Thus, it is a surprising finding made by the present inventors that image density can be strongly improved by thermal transfer printing when a great amount of fine particles is added to layer (B), thereby creating a number of fine voids due to said fine particles in the layer (B). In the present invention, therefore, the effect of this layer (B) is conductive to the cushioning property sufficient to obliterate wrinkles on the surface of the thermal transfer image-receiving sheet, as well as to the sufficient image density by thermal transfer printing. A film having such structure can make a porous polyester film, which has the following cohesive failure index and gloss.

The polyester film (B) may have any void content. It preferably contains voids in a proportion of not less than 20% by volume. When the percentage of voids is not less than 20% by volume, image density can be significantly improved by thermal transfer printing. When it does not reach 20% by volume, a desired image density cannot be achieved.

The average size of the particles to be added to polyester film (B) is preferably 0.1–1 $\mu$m, particularly 0.1–0.5 $\mu$m. When it is less than 0.1 $\mu$m, the void-forming capability during the film stretching step to be mentioned later is pronouncedly degraded. As a result, cleavage strength of the film surface cannot be made 3 or less, and a desired thermal transfer sensitivity cannot be enhanced. Conversely, when particles having an average size of more than 1 $\mu$m are used, void-forming capability can be enhanced, but smoothness of the film surface is noticeably degraded. Then, the film cannot have a gloss of not less than 20%, and thermal transfer sensitivity becomes poor. When voids are created due to the fine particles having an average particle size of 0.1–1 $\mu$m, thermal transfer images having superior gloss and uniformity can be obtained. When fine particles having an average particle size exceeding 5 $\mu$m are added to layer (B), thermal transfer images lose gloss and uniformity.

The particles to be added to polyester film (B) are free of any limitation and may be inorganic particles or organic particles. Preferred are inorganic particles. For example, titanium dioxide, calcium carbonate, barium sulfate, zinc sulfide, silicon dioxide, aluminum oxide, talc, kaolin and the like may be used. The particles may undergo surface treatment as necessary. The agent therefore may be, but not limited to, aluminum oxide, silicon dioxide, zinc oxide, silicon resin, siloxane resin, fluororesin, silane coupling agent, titanate coupling agent, polyol and polyvinylpyridine.

Of those, most preferable particles are titanium oxide fine particles and zinc sulfide fine particles. Titanium oxide fine particles are most preferably used, in view of effective opacifying power afforded to the film. The titanium oxide fine particles may be of either an anatase type or rutile type. An inorganic treatment using alumina and silica may be applied to the surface of the particles, or organic treatment using a silicon agent or alcohol may be applied.

While the amount of the fine particles to be added to polyester film (B) is optional, it is preferably not less than 20 wt %, more preferably 20–50 wt %, and most preferably 25–50 wt %, of the polyester film (B). When the amount is less than 20 wt %, voids cannot be formed satisfactorily, which in turn results in difficulty in making the cohesive failure index of the desired film surface 3 or less. When it exceeds 50 wt %, smoothness of the film surface is drastically lost, which in turn results in difficulty in making the gloss of the film surface not more than 20%.

The thickness of the polyester film (B) is preferably 1–20 μm and not more than 30% of the entire thickness of the porous film, and, particularly less than 30%. While the lower limit is not set, it is preferably 0.5% of the entire film. When the thickness of the polyester film (B) is less than 1 μm, the content of fine particles per film surface area varies greatly and the density of images varies so that the printed matter gives a rough impression. In other words, uniform image density cannot be achieved. On the other hand, when polyester film (B) has a thickness exceeding 20 μm, image density cannot be improved and such layer is meaningless. When this polyester film layer (B) is not less than 0.5% of the thickness of the porous film, bleeding of the polyolefin resin can be suppressed. When the thickness of this layer exceeds 30% of the entire thickness of the porous film, the film as a whole tends to have vastly degraded stretch property. This is undesirable in securing stable productivity at industrial levels. In the present invention, the thickness of the layer (B) is set to not more than 30% of the entire thickness of the film to simultaneously achieve stable industrial production, superior image density and lightweight of the film.

The layers (A) and (B) may contain coloring agent, light resistant agent, fluorescent agent, antistatic and the like where necessary.

The polyester film (B) is preferably formed by coextrusion. This is because it effectively suppresses bleeding of polyolefin resin that occurs at a certain point between immediately after melt extrusion of the resin and solidification by cooling.

Production of Porous Polyester Film

The production of the porous polyester film of the present invention is free of any particular limitation. It can be produced by forming a mixture of the above-mentioned composition to give an unoriented film, and then drawing said unoriented film.

When a two-layer film comprising layers (A) and (B) is prepared, for example, polyester film (layer (A)) and polyester film (B) are adhered to each other by coextrusion, lamination, coating and the like. Of these, coextrusion is most beneficial, which comprises feeding resins of layer (A) and layer (B) into separate extruders, laminating the resins in a molten state and extruding the laminate from a die.

The unoriented sheet thus obtained is biaxially oriented by, for example, stretching such as roll stretching using rolls that rotate at different speeds, tenter stretching that extendably hold the sheet with clips, inflation stretching that uses air pressure and the like. The stretching causes peeling at interface between polyester and incompatible resin, and between polyester and fine particles, and creates many fine voids.

An unoriented sheet is stretched/oriented under the conditions closely related to the generation of voids. In the following, a biaxial orientation method most preferably used, particularly a method comprising stretching an unoriented sheet in the longitudinal direction and then in the widthwise direction is cited as an example to explain stretching and orientation conditions.

First longitudinal stretching step is the most important process for forming a number of fine voids in layer (B). The longitudinal stretching comprises stretching a sheet between two or more rolls having different circumferential speeds. The heating in this step may be by way of heating rolls or noncontact heating, or both in combination. Most preferably, the sheet is stretched while concurrently using roll heating and noncontact heating. In this case, the sheet is preheated, with heating rolls, to a temperature of from 50° C. to less than a glass transition temperature of polyester, and the both surfaces of the sheet are heated with infrared heaters having independent control systems. For the expression of voids in layer (B), heating temperature of layer (B) is set to a lower level. This in turn makes stretch property of layer (A) unstable due to insufficient quantity of heat. The insufficiency is compensated by infrared heating from the opposite side of layer (B), so that it will not heat layer (B). This step of heating the front and rear surfaces of the film at different temperatures during stretching is extremely important. The method of producing difference in temperature by noncontact heating devices is only an example of preferable embodiment, and other methods may be also employed. For example, a sheet is sandwiched between rolls having different temperatures to achieve similar effect. In any event, an important point in forming a multitude of voids derived from inorganic fine particles is to mainly supply sufficient quantity of heat from the side opposite to layer (B) and to stretch layer (B) at a lower temperature. The sufficient quantity of heat is supplied by heating the entire film and the quantity of heat should be enough to uniformly stretch the film.

The monoaxially oriented film thus obtained is introduced into a tenter and drawn 2.5–5 times preferably at 100° C.–200° C.

The biaxially oriented film thus obtained is subjected to heat treatment as necessary. The heat treatment is preferably applied in a tenter at a temperature of from [melting point (Tm, ° C.) of polyester—50° C.] to Tm.

The film of the present invention obtained by the above method contains sufficiently fine voids in layers (A) and (B) and shows superior stability during production.

The polyester film of the present invention may have a coating layer on at least one of the surfaces thereof. This coating layer makes it possible to improve wettability and adhesive property to ink and coating agents. The coating layer is preferably made from a polyester resin. Other compounds that are taught to improve adhesive property of typical polyester film, such as polyurethane resin, poly(ester urethane) resin, acrylic resin and the like, can be used.

A coating layer can be formed by a conventional method such as gravure coating, kiss coating, dip coating, spray coating, curtain coating, air knife coating, blade coating, reverse roll coating and the like. The coating may be formed before stretching of a film, or after longitudinal stretching, or after orientation.

Apparent Specific Gravity

The polyester film of the present invention has an apparent specific gravity of not more than 1.3, more preferably less than 1.3, and most preferably not more than 1.1. While the lower limit of the apparent specific gravity is not set, it is preferably not less than 0.6, preferably not less than 0.7, and most preferably not less than 0.8, to secure resistance to wrinkles. The range of 0.6–1.2, particularly 0.7–1.1, is preferable. When the apparent specific gravity is greater than 1.3, the film contains too small an amount of voids to cause insufficient cushioning property of the porous film. This prevents sufficient image density from being afforded by thermal transfer printing. When the apparent specific gravity is less than 0.6, the porosity becomes too great to result in insufficient strength or insufficient flexibility of the film. When the specific gravity exceeds 1.3, the porosity becomes insufficient, and the beneficial properties afforded by voids, namely, lightweight, cushioning property and flexibility, may not be realized effectively.

Cohesive Failure Index

In the present invention, at least one surface of the polyester film preferably has a cohesive failure index of not more than 3, more preferably not more than 2. This is a vital condition that is conducive to the strikingly increased image density by thermal transfer printing. On the other hand, when the cohesive failure index of the film surface exceeds 3, the image density is of the same level as that of a known porous polyester film.

The cohesive failure index of the surface indicates cohesion of polyester constituting the film surface, and the greater the index, the greater the cohesion is. The cohesive failure index of the surface is determined by the size of the voids present in the polyester constituting the vicinity of the film surface. In other words, a smaller cohesive failure index means formation of many fine voids in the vicinity of the film surface. The vastly increased image density is attributable to this effect.

Surface Glass

The polyester film of the present invention has a cohesive failure index of the surface of not more than 3, and the surface has a gloss of not less than 20%, more preferably not less than 30%. When the surface gloss is less than 20%, the smoothness of the film surface, and thus, smoothness of the surface of the thermal transfer image-receiving sheet, is impaired. This in turn causes difficulty in uniformly bringing an ink ribbon and image-receiving paper into close contact during thermal transfer. As a result, image density is markedly degraded and quality of the printed matter becomes poor due to rough thermal transfer images.

Dynamic Hardness

In the present invention, at least one surface of the film has a dynamic hardness of preferably not more than 5.0, more preferably not more than 4.0, and most preferably not more than 3.0. This is one of the most essential requirements in the present invention, which strikingly improves image density by thermal transfer printing. On the contrary, when it exceeds 5.0, the image density reaches only the same level as conventional porous polyester films.

When the polyester film of the present invention has both the dynamic hardness of the surface of not more than 5.0 and the gloss of said surface of preferably not less than 20%, more preferably not less than 30%, surface smoothness can be further improved. When the surface lacks gloss of 20%, the smoothness of the film surface, and thus, smoothness of the surface of the thermal transfer image-receiving sheet, are impaired. This in turn causes difficulty in uniformly bringing an ink ribbon and image-receiving paper into close contact during thermal transfer. As a result, image density is markedly degraded and quality of a printed matter may become poor due to rough thermal transfer images.

The above-mentioned dynamic hardness and gloss are adjusted by any method and free of any limitation. For example, by forming an extremely fine and uniform porous structure on the surface layer of a film, dynamic hardness and gloss can be controlled to fall within the above-mentioned range. Such porous structure can be formed by uniform biaxial orientation as in the following.

A layer (B) having fine voids due to fine particles having an average particle size of 0.1–1 μm is formed on the surface of layer (A) to give a film having dynamic hardness and gloss within the range as mentioned above. The fine voids due to fine particles exist at least a port around the fine particles and can be confirmed by sectional photographs of electron microscope.

When the particles to be added to the layer (B) do not have an average particle size of 0.1 μm, the voids are formed insufficiently in the film drawing process. As a result, the dynamic hardness of the film becomes less than 5.0, thus failing to improve thermal transfer sensitivity. On the other hand, when particles having an average particle size exceeding 5 μm are used, smoothness of the film surface is markedly impaired, despite superior void-forming capability. Thus, it is preferably 0.1–3 μm, more preferably 0.1–2 μm, and most preferably 0.1–1 μm.

Color

While the color of the polyester film of the present invention is not limited, it is preferable that b value according to JIS Z 8729-1994 be less than 3. When it exceeds 3, the film becomes yellow, ruining its grade.

Resistance to Wrinkles

The inventive porous polyester film preferably shows Rank A in the resistance to wrinkle test to be mentioned later.

The porous polyester film thus obtained is both highly flexible and lightweight. Inasmuch as it does not require addition of surfactant or polyether resin as a dispersing agent of the polyolefin resin, it is superior in heat resistance. The self-reclaimed resin can be used as a starting material since it suffers from less color change. In addition, stability of film production is superior. When a self-reclaimed resin is used, the content thereof (self-reclaimed resin/(self-reclaimed resin+virgin resin)×100) is preferably 5–50 wt %.

The polyester film thus obtained shows noticeable improvement in optical image density, while retaining superior resistance to wrinkles and superior surface smoothness as compared to conventional porous films.

A thermal transfer image-receiving sheet is prepared from the inventive porous polyester film by forming a recording layer on the surface thereof to receive ink and diffusion (sublimation) dye transferred from a thermal transfer ink sheet. Such recording layer may be directly formed on the film, or may be formed via an undercoating layer, such as easy adhesion layer, whiteness improving layer and antistatic layer.

The polyester film of the present invention may be used alone as a substrate or may be used in combination with other substrates. Examples of other substrates include, but not limited to, natural paper, various synthetic resin films, woven fabric, nonwoven fabric and the like.

It is also possible to form an adhesive layer on the other side of the receiving layer for use as an adhesive label permitting thermal transfer printing.

The inventive thermal transfer image-receiving sheet thus produced preferably has a surface gloss of not less than 50%, more preferably not less than 80%, particularly preferably not less than 90%.

It is also preferable that the inventive thermal transfer image-receiving sheet have ratio of print density of not less than 100%, as calculated by the image density measurement method to be mentioned later.

The preferable films of the present invention are as follows.

(1) A porous polyester film having an apparent specific gravity of less than 1.3, which comprises a polyester film having many voids (layer (A)) comprising a polyester and a thermoplastic resin incompatible with said polyester, and a polyester film having many fine voids (layer (B)) comprising a polyester and inorganic fine particles having an average particle size of less than 1 μm, the two layers being bonded to each other, wherein the layer (B) has a porosity of not less than 20% by volume, and a thickness of 1–20 μm that is less than 30% of the thickness of the porous film.

(2) The porous polyester film of (1) above, wherein the apparent specific gravity of the film is not less than 0.8.

(3) The porous polyester film of (1) above, wherein the inorganic fine particles in layer (B) have an average particle size of 0.1–0.5μm.

(4) The porous polyester film of (1) above, wherein the inorganic fine particles in layer (B) are titanium oxide fine particles.

(5) The porous polyester film of (1) above, wherein the inorganic fine particles in layer (B) are zinc sulfide fine particles.

(6) The porous polyester film of (1) above, wherein the thermoplastic resin incompatible with polyester in layer (A) includes polystyrene resin, polymethylpentene resin and polypropylene resin, and a polystyrene resin content (X wt %), a polymethylpentene resin content (Y wt %) and a polypropylene resin content (Z wt %) satisfy the following equations:

$0.01 \leq X/(Y+Z) \leq 1$ $Z/Y \leq 1$ $5 \leq X+Y+Z \leq 30.$ (7) A porous polyester film obtained by subjecting a polymer mixture of a polyester and a thermoplastic resin incompatible with said polyester to biaxial orientation and heat treatment, wherein the thermoplastic resin incompatible with polyester includes polystyrene resin, polymethylpentene resin and polypropylene resin, and a polystyrene resin content (X wt %), a polymethylpentene resin content (Y wt %) and a polypropylene resin content (Z wt %) satisfy the following equations:

$0.01 \leq X/(Y+Z) \leq 1$ $Z/Y \leq 1$ $5 \leq X+Y+Z \leq 30.$ (8) A porous polyester film of (7), which has a skin layer substantially free of polyolefin resin at least on one surface thereof, the skin layer having a thickness of 0.5–30% of the thickness of the porous film.

(9) The porous polyester film of (7) above, which has an apparent specific gravity of 0.6–1.2.

(10) The porous polyester film of (7) above, which has a self-reclaimed resin content of not less than 5 wt % of the entire starting material of the film.

(11) The porous polyester film of (7) above, which has a resistance to wrinkles of Rank A and an apparent specific gravity of 0.6–1.2.

(12) The porous polyester film of (11) above, wherein the color of the film is b value, according to JIS Z8729-1994, which is less than 3.

(13) A porous polyester film comprising a polyester and a thermoplastic resin compatible with said polyester, which film having an apparent specific gravity of not more than 1.3, one of the surfaces thereof having a cohesive failure index of not more than 3 and a surface gloss of not less than 20%.

(14) The porous polyester film of (13) above, further comprising a polyester layer (skin layer) comprising a polyester and fine particles having an average particle size of 0.1–1 μm bonded to at least one surface thereof.

(15) The porous polyester film of (14) above, wherein the sldn layer has a porosity of not less than 20% by volume.

(16) The porous polyester film of (14) above, wherein the skin layer has a thickness of 1–20 μm that is less than 30% of the porous film thickness.

(17) The porous polyester film of (14) above, wherein the skin layer contains fine particles of titanium oxide.

(18) The porous polyester film of (14) above, wherein the skin layer contains fine particles of zinc sulfide.

(19) The porous polyester film of (13) above, wherein the thermoplastic resin incompatible with polyester includes polystyrene resin, polymethylpentene resin and polypropylene resin, and a polystyrene resin content (X wt %), a polymethylpentene resin content (Y wt %) and a polypropylene resin content (Z wt %) satisfy the following equations:

$0.01 \leq X/(Y+Z) \leq 1$ $Z/Y \leq 1$ $3 \leq X+Y+Z \leq 20.$

(20) The porous polyester film of (13) above, having a resistance to wrinkles of Rank A.

(21) The porous polyester film of (20) above, wherein a relative optical image density is greater than 95%.

(22) A porous polyester film, comprising a polyester and a thermoplastic resin incompatible with said polyester, the film having an apparent specific gravity of not more than 1.3, a dynamic hardness of one of the surfaces thereof of not more than 5.0 and a surface gloss of not less than 20%.

(23) The porous polyester film of (22) above, further comprising a polyester layer (skin layer) comprising a polyester and fine particles having an average particle size of 0.1–5 μm bonded to at least one surface thereof.

(24) The porous polyester film of (23) above, wherein the skin layer has a porosity of not less than 20% by volume.

(25) The porous polyester film of (23) above, wherein the skin layer has a thickness of 1–20 μm that is which is less than 30% of the film thickness.

(26) The porous polyester film of (23) above, wherein the skin layer contains fine particles of titanium oxide.

(27) The porous polyester film of (23) above, wherein the skin layer contains fine particles of zinc sulfide.

(28) The porous polyester film of (22) above, wherein the thermoplastic resin incompatible with polyester includes polystyrene resin, polymethylpentene resin and polypropylene resin, and a polystyrene resin content (X wt %), a polymethylpentene resin content (Y wt %) and a polypropylene resin content (Z wt %) satisfy the following equations:

$0.01 \leq X/(Y+Z) \leq 1$ $Z/Y \leq 1$ $3 \leq X+Y+Z \leq 20.$

(29) The porous polyester film of (22) above, having a resistance to wrinkles of Rank A.

(30) The porous polyester film of (29) above, wherein a relative optical image density is greater than 95%.

The present invention is described in more detail by way of Examples and Comparative Examples.

The measurement methods and evaluation methods used in the present invention are explained in the following.

1) Apparent Specific Gravity

A film is precisely cut out in a square of 10 cm×10 cm. The thickness thereof is measured at 50 points and average thickness T (unit: $\mu$m) is determined. The sample is weighed to 0.1 mg and taken as W (unit: g). The apparent specific gravity is calculated by the following formula.

Apparent specific gravity $(-)=(w/t)\times 100$

2) Resistance to Wrinkles (Flexibility of Film)

A thermal transfer image-receiving sheet is cut into 5 cm long, 1 cm wide strips. The strips are wound around a 5 mm diameter glass rod and rubbed. Then, the samples are stretched again, and wrinkles created on the surface are observed with a stereoscopic microscope.

Rank A: no fold wrinkles

Rank B: narrow wrinkles in the entirety of the surface

Rank C: thick wrinkles in the entirety of the surface

3) Surface Gloss

Using VGS-1001DP (manufactured by Nippon Denshoku Kogyo Co., Ltd.), a degree of reflection at 60° is measured.

4) Thermal Transfer Printing Property (Optical Image Density)

Using a commercially available sublimation transfer ink ribbon (attached to printing set P-PS100 for sublimation transfer printer manufactured by Caravelle Data Systems Co., Ltd.) and commercially available printer (thermal transfer label printer BLP-323 manufactured by Bon Electric Co., Ltd.), a thermal transfer image-receiving sheet cut into an A6 size is printed at printing speed of 100 mm/sec and head voltage of 18 V. The printing patterns are in four colors of C (Cyan), M (magenta), Y (yellow) and K (black) which can be created by printing the others over one another. Seven 9 mm×9 mm square Characters for each color are arranged on an A6 sheet, the number of Characters totaling 28.

After printing, reflection optical density (OD) of each of C, M, Y and K colors is determined using Macbeth densitometer (TR-927) and an average density of the four colors (total 28 sites) is determined.

In the same manner as above, an average optical density is determined for a commercially available image-receiving paper attached to the above-mentioned printing set The image-receiving paper comprises foamed polypropylene films laminated on a natural paper to form a recording layer. The thermal transfer printing property is evaluated based on the proportion (%) of optical sample density to the density of the commercially available image-receiving paper. A thermal transfer image-receiving sheet of Example 2 may be used as a standard sheet.

5) Porosity of Layer (B)

Taking the thickness of layer (B) of an unoriented film as T1, the thickness of layer (B) of a biaxal orientation film as T2, and total draw ratio of film=longitudinal draw ratio× transverse draw ratio (actually measured by marking draw ratio on an unoriented film) as D, calculation is done according to the following formula:

Porosity $(\%)=100-100\times T1/(T2\times D)$

The porosity of layer (B) can be determined by the above-mentioned method. In addition, it can be calculated from changes in thickness of layer (B) before and after heat press, observation of cross section of the film with an electron microscope or other method. When porosity is determined by heat press, the voids in the film are completely collapsed in a heat press machine. Taking changes in thickness of layer (B) before and after heat press (observation with an electron microscope) F=(thickness of layer (B) after heat press)/(thickness of layer (B) before heat press), changes in weight per unit area of the film before and after heat press G=(weight per unit area (cm$^2$) after heat press)/(weight per unit area before heat press), porosity can be calculated by the following formula:

Porosity $(\%)=100-(F/G)\times 100$.

6) Thickness of Layer (B)

Actually measured by observing the cross section of the film with an electron microscope.

EXAMPLE 1

Preparation of Void-forming Agent

Polyethyleneterephthalate resin pellets (70 wt %) having an intrinsic viscosity of 0.64, polystyrene resin (6 wt %, TOPOREX 570-57U, manufactured by MITSUI TOATSU CHEMICALS, INC.) having a melt flow rate of 1.7, polypropylene resin pellets (6 wt %, NOBLEN FO-50F, manufactured by MITSUI TOATSU CHEMICALS, INC.) having a melt flow rate of 1.7, and polymethylpentene resin pellets (18 wt %, , TPX, RT-18, manufactured by Mitsui Chemicals Inc.) having a melt flow rate of 26 were mixed and supplied to a twin-screw extruder. The mixture was thoroughly kneaded and extruded. Strands were cast in water for cooling and cut with a strand cutter to give master pellets containing a void-forming agent The obtained master pellets were dried with hot air (170° C.×3 hours). Thereto were added master pellets (40 wt %), poly(ethylene terephthalate) resin (58 wt %) having an intrinsic viscosity of 0.62 which had been dried with hot air in the same manner, and anatase titanium dioxide (2 wt %, TA-300, manufactured by Fuji Titanium Inc.) having an average particle size of 0.3 $\mu$m (electron microscope method) to give a starting material of layer (A).

The starting material of layer (B) was prepared by pre-kneading Polyethyleneterephthalate resin (65 wt %) having an intrinsic viscosity of 0.64 and anatase titanium dioxide (35 wt %, TA-300, manufactured by Fuji Titanium Inc.) to give a resin and drying this resin with hot air (170° C.×3 hours).

Preparation of Unoriented Film

The starting material prepared by the above-mentioned method was supplied to an extruder. The material of layer (A) was fed into a twin-screw extruder and the material of layer (B) was fed into a monoscrew extruder. By feeding into a feed block, layer (B) was bonded to one side of layer (A). The discharge amount was adjusted with a gear pump so that the volume ratio of layer (A) to layer (B) became 92:8. Using a T die, the mixture was extruded on a cooling drum adjusted to 30° C. to give an unoriented sheet having a thickness of about 620 $\mu$m. In so doing, layer (B) was extruded on a non-drum side and layer (A) was extruded on a drum side.

Preparation of Biaxially Oriented Film

The obtained unoriented sheet was uniformly heated to 65° C. with a heating roll, and drawn 3.4 times between nip rolls. The interval of the nip rolls was 25 cm and film rate was 2 m/min. I heaters (standard 20 W/cm) equipped with a gold reflecting film were set in the center of the nip rolls and facing the films at 1 cm from the film surface. The layer (A) side was heated with 100% of the standard current and the layer (B) side was heated with 60% of the standard current. The monoaxially stretched film thus obtained was led to a tenter, heated to 150° C. and transversely drawn 3.5 times. The film was tentered, heated at 220° C. for 5 seconds and relaxed by 4% in the transverse direction at 210° C. to give a porous polyester film having a thickness of 75μm (Example 1).

Preparation of Thermal Transfer Image-receiving Sheet

A coating solution having the following composition was applied to the surface of layer (B) of the porous polyester film obtained above, so that the weight after dying became 4 g/m$^2$:

| | |
|---|---|
| Water dispersible copolyester resin | 2 parts by weight |
| Water dispersible acrylic styrene copolymer | 5 parts by weight |
| Water dispersible isocyanate crosslinking agent | 0.5 part by weight |
| Water | 67.4 parts by weight |
| Isopropyl alcohol | 25 parts by weight |
| Surfactant | 0.1 part by weight |

The size was fixed and the film was heated at 160° C. for 30 seconds to form a recording layer, whereby a thermal transfer image-receiving sheet was prepared.

Comparative Example 1

In the same manner as in Example 1 except that the both surfaces of the film was infrared heated with 90% of the standard current for longitudinal drawing, a porous polyester film having a thickness of 75 μm was obtained. In the same manner as in Example 1, a thermal transfer image-receiving sheet was prepared.

Comparative Example 2

In the same manner as in Example 1 except that a polyester resin comprising zeolite particles (15 wt %) having an average particle size of 1.2 μm (electron microscope method) was used as a starting material of layer (B), a porous polyester film was obtained. In the same manner as in Example 1, a thermal transfer image-receiving sheet was prepared.

Comparative Example 3

In the same manner as in Example 1 except that the discharge amount was adjusted with a gear pump so that the volume ratio of layer (A) to layer (B) became 60:40, a porous polyester film was obtained. In the same manner as in Example 1, a thermal transfer image-receiving sheet was prepared.

Comparative Example 4

In the same manner as in Example 1 except that the starting material of layer (A) was a mixture of poly(ethylene terephthalate) resin (90 wt %) having an intrinsic viscosity of 0.64 and anatase titanium dioxide (10 wt %, TA-300, manufactured by Fuji Titanium Inc.), a porous polyester film was obtained. In the same manner as in Example 1, a thermal transfer image-receiving sheet was prepared.

EXAMPLE 2

In the same manner as in Example 1 except that the starting material of layer (B) was prepared by pre-kneading poly(ethylene terephthalate) resin (65 wt %) having an intrinsic viscosity of 0.64 and zinc sulfide fine particles (35wt %) having an average particle size of 0.4 μm (electron microscope method) and drying with hot air at 170° C.×3 hours), a porous polyester film was obtained. In the same manner as in Example 1, a thermal transfer image-receiving sheet was prepared.

EXAMPLE 3

In the same manner as in Example 1 except that layer (B) was laminated on both surfaces of layer (A) and the volume ratio of layer (A) to layer (B) was changed to 85:15, a porous polyester film was obtained. In the same manner as in Example 1, a thermal transfer image-receiving sheet was prepared. In the same manner as in Example 1, infrared heater was used to heat at 60% of the normal value to form a non-drum surface.

Comparative Example 5

A thermal transfer recording layer was formed on the other surface (surface heated with infrared heater at 100% of the standard level=drum surface) of the porous polyester film of Example 3 to give a thermal transfer image-receiving sheet.

Comparative Example 6

Chips of poly(ethylene terephthalate) and master chips containing poly(ethylene glycol) having a molecular weight of 4000 which had been added during polymerization of polyethyleneterephthalate were dried in vacuo at 180° C. Then, poly(ethylene terephthalate) (89 wt %), poly(ethylene glycol) (1 wt %), polymethylpentene (10 wt %, TPX, DX-820 manufactured by MITSUI TOATSU CHEMICALS, INC.) having a melt flow rate of 180 were mixed and fed into an extruder heated to 270–300° C. Separately, poly(ethylene terephthalate) having an average particle size of 0.8 μm (electron microscope method) containing calcium carbonate particles (14 wt %, Softon 3200 manufactured by Bihoku Funka Kabushiki Kaisha) were dried as mentioned above and fed into an extruder. The polymer extruded from the extruder was laminated to give a three-layer structure of B/A/B, which was formed into a sheet using a T die. This sheet was cooled on cooling drums having a surface temperature of 25° C. to allow solidification to give an unoriented sheet. The sheet was led to rolls heated to 85–95° C., drawn 3.6 times in the longitudinal direction and cooled with rolls at 25–50° C.

Then, the film longitudinally drawn was held at both ends with clips and led to a tenter. The film was drawn 3.6 times in the direction forming a right angle with the longitudinal direction, under an atmosphere heated to 130° C. The film was thermally fixed in the tenter at 230° C., uniformly cooled to room temperature and taken up, whereby a porous polyester film was obtained. In the same manner as in Example 1, a thermal transfer image-receiving sheet was prepared.

The above-mentioned Examples and Comparative Examples are summarized in Table 1 with regard to properties.

TABLE 1

| | Properties of porous film | | | Properties of heat transfer recording sheet | | | |
|---|---|---|---|---|---|---|---|
| | Layer thickness (μm) | Porosity of layer (B) (%) | Production of film | Apparent specific gravity | Optical image density | Resistance to wrinkles | Surface gloss |
| Example 1 | B/A = 6/69 | 40 | extremely stable | 0.96 | 105% | A | 98% |
| Com. Ex. 1 | B/A = 4.5/70 | 15 | extremely stable | 0.98 | 91% | A | 98% |
| Com. Ex. 2 | B/A = 5/70 | 25 | extremely stable | 0.95 | 95% | A | 25% |
| Com. Ex. 3 | B/A = 33/42 | 35 | frequent breakage, stable film forming unattainable | 1.04 | 101% | A | 99% |
| Com Ex. 4 | B/A = 6/48 | 35 | extremely stable | 1.40 | 75% | A | 98% |
| Example 2 | B/A = 5.5/69 | 30 | extremely stable | 0.98 | 100% | A | 93% |
| Example 3 | B/A/B = 4.5/65/6 | 35* | extremely stable | 0.93 | 103% | A | 98% |
| Com. Ex. 5 | B/A/B = 4.5/65/6 | 15** | extremely stable | 0.93 | 81% | A | 102% |
| Com. Ex. 6 | B/A/A = 7/86/7 | 15 | occurrence of breakage, stable film forming was difficult | 0.78 | 95% | C | 45% |

*: non-drum surface
** : drum surface

From the results of Table 1, the following analysis is possible. The thermal transfer recording sheets using the films of Examples 1 to 3 as substrates satisfy the requirements of the present invention. Consequently, superior surface smoothness, superior resistance to wrinkles and high optical density thermal transfer images could be obtained. In contrast, Comparative Example 1, Comparative Example 5 and Comparative Example 6 wherein layer (B) having smaller porosity than as mired in the present invention showed marked decrease in image density.

In Comparative Example 2 wherein inorganic fine particles to be added to layer (B) had a particle size exceeding the requirements of the present invention showed noticeably degraded surface gloss. In Comparative Example 3 wherein layer (B) had a thickness greater than the requirements of the present invention suffered tremendous difficulty in stable production of the film, thus failing to industrially produce the film. In Comparative Example 4 wherein the film had an apparent specific gravity greater than the requirements of the present invention failed to achieve sufficient optical image density.

The measurement methods and evaluation methods used in the following Examples and Comparative Examples are explained in the following.

1) Apparent Specific Gravity

Measured and calculated in the same manner as above.

2) Cohesive Failure Index

Two kinds of adhesive tapes [(1) mending tape T-118, manufactured by KOKUYO CO., LID. (18 mm width) and (2) cellophane tape (24 mm width), manufactured by NICHIBAN COMPANY, LIMITED] are prepared. These tapes are cut in 50 mm length (folded back at end) and adhered to the films while preventing inclusion of air. The surface of the tape is rubbed to achieve sufficient adhesion. Then, the tape is peeled off at once in the parallel direction to the sheet. The film surface is evaluated and rated in 5 ranks depending on the peeling state on the surface.

cohesive failure index=1:
   tape (1)→peeling in the entirety
   tape (2)→peeling in the entirety
cohesive failure index=2:
   tape (1)→partial peeling
   tape (2)→peeling in the entirety
cohesive failure index=3:
   tape (1)→no peeling
   tape (2)→peeling in the entirety
cohesive failure index=4:
   tape (1)→no peeling
   tape (2)→partial peeling
cohesive failure index=5:
   tape (1)→no peeling
   tape (2)→no peeling 3) Surface Gloss Using VGS-1001DP (manufactured by Nippon Denshoku Kogyo Co., Ltd) degree of reflection at 60° is measured.

4) Thermal Transfer Sensitivity Property (Relative Image Density)

A coating solution having the following composition is applied to the surface of the film, so that the weight after dying becomes 4 g/m$^2$:

| | |
|---|---|
| Water dispersible copolyester resin | 2 parts by weight |
| Water dispersible acrylic styrene copolymer | 5 parts by weight |
| Water dispersible isocyanate crosslinking agent | 0.5 part by weight |
| Water | 67.4 parts by weight |
| Isopropyl alcohol | 25 parts by weight |
| Surfactant | 0.1 part by weight |

The size is fixed and the film is heated at 160° C. for 30 seconds to form a recording layer, whereby a thermal transfer image-receiving sheet is prepared.

Using a commercially available ink ribbon (attached to printing set P-PS100 for sublimation transfer printer manufactured by Caravelle Data systems Co., Ltd.) and commercially available printer (thermal transfer label printer BLP-323 manufactured by Bon Electric Co., Ltd.), a thermal transfer image-receiving sheet thus obtained and cut into an A6 size is printed at printing speed of 100 mm/sec and head voltage of 18 V. The printing patterns are in four colors of C (cyanogen), M (magenta), Y (yellow) and K (black) which can be created by printing the others over one another. Seven 9 mm×9 mm square Characters for each color are arranged in an A6 sheet, the number of Characters totaling 28.

After printing, reflection optical density of each of C, M, Y and K colors is determined using Macbeth densitometer (TR-927) and an average density of the four colors (total 28 sites) is determined.

In the same manner as above, an average optical density is determined for a commercially available image-receiving paper attached to a commercially available printing set P-PS 100 for sublimation transfer printer manufactured by Caravelle Data systems Co., Ltd.). The paper comprises foamed polypropylene films laminated on a natural paper to form a recording layer. The thermal transfer printing property is evaluated based on the proportion (%) of optical sample density to the optical density of the commercially available image-receiving paper.

5) Resistance to Wrinkles

Actually measured in the same manner as above.

6) Thickness of B Layer

Actually measured in the same manner as above.

8) Dynamic Hardness (DH)

Using dynamic ultrafine hardness meter (DUH-201) manufactured by SHIMADZU CORPORATION, a load of 0.2 gf is applied to 115° trigonal pyramid indenter and depth of indention at the load is determined. Calculation by the following formula gives dynamic hardness.

$$DH = 37.838 \cdot P/h^2$$

wherein P is test load (gf) and h is depth of indention of the indenter (μm).

EXAMPLE 4

Preparation of Void-forming Agent

As a starting material, polystyrene resin pellets (20 wt %, TOPOREX 570-57U, manufactured by MITSUI TOATSU CHEMICALS, INC.) having a melt flow rate of 1.7, polypropylene resin pellets (20 wt %, NOBLEN FO-50F, manufactured by MITSUI TOATSU CHEMICALS, INC.) having a melt flow rate of 1.7, and polymethylpentene resin pellets (60 wt %, TPX, RT-18, manufactured by Mitsui chemicals Inc.) having a melt flow rate of 8 were mixed and supplied to a twin-screw extruder to give a void-forming agent.

Preparation of Master Pellet Containing Fine Particles

A mixture of poly(ethylene terephthalate) resin (50 wt %) having an intrinsic viscosity of 0.64 and anatase titanium dioxide (50 wt %, TA-300, manufactured by Fuji Titanium Inc.) having an average particle size of 0.3 μm (electron microscope method) was fed into a twin-screw extruder and pre-kneaded. The molten polymer was continuously fed into a vent type monoscrew extruder and kneaded to give master pellets containing fine particles of titanium oxide.

The void-forming agent (10 wt %) and master pellets (5 wt %) containing fine particles (titanium oxide) obtained by the above method and poly(ethylene terephthalate) resin (85 wt %) having an intrinsic viscosity of 0.62 were mixed and dried in vacuo to give a starting material of the film constituting layer (A).

The Polyethyleneterephthalate resin pellets (30 wt %) having an intrinsic viscosity of 0.62 and master pellets (70 wt %) containing fine particles (titanium oxide) obtained above were mixed and dried in vacuo to give a starting material of the film constituting layer (B).

Preparation of Unoriented Film

The starting materials constituting respective layers were supplied to respective extruders. Using a feed block, layer (B) was bonded to one side of layer (A) in a molten state. The discharge amount was adjusted with a gear pump so that the volume ratio of layer (A) to layer (B) became 93:7. Using a T die, the mixture was extruded on a cooling drum adjusted to 30° C. to give an unoriented sheet having a thickness of about 600 μm. In so doing, layer (B) was extruded on a non-drum side and layer (A) was extruded on a drum side.

Preparation of Biaxially Oriented Film

The obtained unoriented sheet was uniformly heated to 65° C. with a heating roll. The film was sandwiched between a metal roll controlled to 65° C. and a rubber roll free of temperature control, to adjust the running rate to 2 m/min. Likewise, a high speed roll controlled to 6.8 m/min, a metal roll controlled to 30° C. and a rubber roll free of temperature control, were used to draw the sheet 3.4 times. The interval between the two sets of rolls disposed in parallel relation and used for rate control was 25 cm at the rate controll point and the B side (non-drum surface) was in contact with the rubber roll side. Infrared heaters (standard 20 W/cm) equipped with a gold reflecting film were set in the center of the nip rolls and facing the films at 1 cm from the film surface. The layer (A) side was heated with 100% of the standard current and the layer (B) side was heated with 60% of the standard current. The monoaxially stretched film thus obtained was led to a tenter, heated to 150° C. and transversely drawn 3.5 times. The film was tentered, heated at 220° C. for 5 seconds and relaxed by 4% in the transverse direction at 210° C. to give a porous polyester film having a thickness of 75 μm.

Comparative Example 7

In the same manner as in Example 4 except that the both surfaces of the film were infrared heated with 95% of the standard current during longitudinal drawing, a porous polyester film was obtained.

Comparative Example 8

In the same manner as in Example 4 except that the starting material of layer (B) was master pellets containing fine particles (titanium oxide) alone upon drying in vacuo, a porous polyester film was obtained.

Comparative Example 9

In the same manner as in Example 4 except that the starting material of layer (A) was a mixture of master pellets (10 wt %) containing fine particles (titanium oxide) upon drying in vacuo, poly(ethylene terephthalate) resin pellets (83 wt %) upon drying in vacuo having an intrinsic viscosity of 0.62, and polystyrene resin pellets (7 wt %, TOPOREX 570-57U, manufactured by MITSUI TOATSU CHEMICALS, INC.) having a melt flow rate of 1.7, a porous polyester film was obtained.

EXAMPLE 5

In the same manner as in Example 4 except that the master pellets used for layer, (B) contained zinc sulfide fine particles having an average particle size 0.3 μm (electron microscope method) instead of titanium oxide particles, a porous polyester film was obtained. The starting material of layer (A) was the same as in Example 4.

EXAMPLE 6

In the same manner as in Example 4 except that the discharge amount was adjusted so that the volume ratio of layer (A) to layer (B) became 85:15 and the discharge amount of layer (B) was evenly divided into two to form two layers on the both surfaces of layer (A), an unoriented sheet having a structure of layer (B1) (non-drum surface)/layer (A)/layer (B2) (drum surface) was obtained. In the same manner as in Example 4, a porous polyester was obtained.

EXAMPLE 7

In the same manner as in Example 4 except that the starting material of layer (B) was a mixture (after drying in vacuo) of poly(ethylene terephthalate) resin pellets (40 wt %) upon drying in vacuo having an intrinsic viscosity of 0.62, master pellets (50 wt %) containing fine particles (titanium oxide) used in Example 4, and master pellets (10 wt %) containing a fluorescent brightener (polyethyleneterephthalate resin having an intrinsic viscosity of 0.62 containing 2 wt % of OB-1 manufactured by Eastman). Other process was the same as in Example 4, whereby an unoriented sheet was obtained.

The obtained unoriented sheet was uniformly heated to 83° C. with a heating roll. The film was sandwiched between a metal roll controlled to 93° C. and a rubber roll free of temperature control, to adjust the running rate to 2 m/min. Likewise, a high speed roll controlled to 6.8 m/min, a metal roll controlled to 30° C. and a rubber roll free of temperature control, were used to draw the sheet 3.4 times. The interval between the two sets of rolls disposed in parallel relation and used for rate control was 25 cm at the rate control point and the B side (non-drum surface) was in contact with the rubber roll side. In this Example, an auxiliary heating device was not used, but the film was heated with rolls alone.

The monoaxially stretched film thus obtained was led to a tenter, heated to 120° C. and transversely drawn 3.5 times.

Comparative Example 11

In the same manner as in Example 4 except that the master pellets used for layer (B) contained zinc sulfide fine particles having an average particle size 0.3 $\mu$m (electron microscope method) instead of titanium oxide particles, a porous polyester film was obtained. The staring material of layer (A) was the same as in Example 4.

EXAMPLE 8

In the same manner as in Example 4 except that the void-forming agent/fine particles (titanium oxide)-containing master pellets/polyethyleneterephthalate resin having an instrinsic viscosity of 0.62=7/5/88, a porous polyester film was obtained.

The evaluation is shown in Table 2.

TABLE 2

|  | Apparent specific gravity | Cohesion failure index *1 | Dynamic hardness *1 | Gloss *1 (%) | Layer thickness construction ($\mu$m) | Void content of layer (B) (%) | Relative optical image density (%) | Resistance to wrinkles |
|---|---|---|---|---|---|---|---|---|
| Example 4 layer B | 0.93 | 1 | 1.8 | 48 | B/A = 6.5/68 | 40 | 107 | A |
| Layer A |  | 5 | 13.5 | 93 |  |  | 92 |  |
| Comp. Ex. 7 | 0.97 | 4 | 5.8 | 55 | B/A = 4.5/67 | 15 | 92 | A |
| Comp. Ex. 8 | 0.90 | 1 | 1.2 | 11 | B/A = 8/67 | 55 | 85 |  |
| Comp. Ex. 9 | 1.33 | 1 | 2.8 | 52 | B/A = 6/46 | 35 | 91 | A |
| Example 5 | 0.95 | 2 | 2.7 | 46 | B/A = 5.5/67 | 30 | 102 | A |
| Example 6 | 0.92 | 1 | 2.0 | 48 | B1/A/B2 = 6.5/65/4.5 | 40 | 105 | A |
| Example 7 | 1.00 | 3 | 3.9 | 52 | B/A = 5/64 | 25 | 98 | A |
| Comp. Ex. 10 | 0.79 | 4 | 8.7 | 35 | B1/A/B2 = 7/86/7 | 15 | 95 | C |
| Comp. Ex. 11 | 0.95 | 5 | 11.7 | 90 | B/A = 4/67 | 5 | 89 | A |
| Example 8 | 1.11 | 1 | 2.2 | 50 | 6.5/56 | 40 | 100 | A |
| Ref. Ex. | Marketed product, having a receiving layer of foamed polyolefin film formed on both sides of natural paper |  |  |  |  |  | 100 | B |

*1: Unless specifically indicated, denotes property of layer (13) or non-drum surface.

The film was tentered, heated at 220° C. for 5 seconds and relaxed by 4% in the transverse direction at 210° C. to give a porous polyester film.

Comparative Example 10

To poly(ethylene terephthalate) chip (88 wt %) having an intrinsic viscosity of 0.62 and dried in vacuo were added poly(ethylene glycol) flakes (2 wt %) having a molecular weight of 4000 and polymethylpentene pellets (10 wt %, RPX, DX-820, manufactured by MITSUI TOATSU CHEMICALS, INC.) having a melt flow rate of 180 to give a staring material of layer (A).

On the other hand, master pellets containing 30 wt % of calcium carbonate fine particles (Softon 3200, manufactured by Bihoku Funka Kabushiki Kaisha) having an average particle size of 0.8 $\mu$m (electron microscope method) were prepared in the same manner as in Example 4. This master pellets (45 wt %) and polyethyleneterephthalate resin (55 wt %) having an intrinsic viscosity of 0.62 were mixed and dried in vacuo to give a starting material constituting layer (B).

The staring materials constituting respective layers were supplied to respective extruders. Using a feed block, layer (B) was bonded to both sides of layer (A). Thereafter, the sheet was longitudinal drawn 3.5 times at 98° C. by a conventional method, transversely drawn 3.2 times at 125° C., and then heat treated at 220° C. to give a porous polyester film.

From the results of Table 2, the following analysis is possible. The thermal transfer recording sheets using the films of Examples 4 to 8 as substrates satisfy the requirements of the present invention. Consequently, superior surface smoothness, superior resistance to wrinkles and high optical density thermal transfer images could be obtained. In contrast, Comparative Example 9 wherein an apparent specific gravity was greater than as required in the present invention, Comparative Examples 7, 10 and 11 having greater cohesive failure index of the surface than as required in the present invention, and Comparative Example 8 wherein surface gloss was less than as required in the present invention showed smaller relative image density and high optical density thermal transfer images could not be obtained.

To conclude, the present invention provides a porous polyester film for an image-receiving sheet having superior surface smoothness, superior resistance to wrinkles and high optical density thermal transfer images.

The measurement methods and evaluation methods used in the following Examples, Reference Examples and Comparative Examples are explained in the following.
1) Apparent Specific Gravity
  Measured and calculated in the same manner as above.
2) Flexibility of Film
  Evaluated in the same manner as above.

3) Color of Film

According to JIS Z8729-1994, the color is evaluated based on Y values.

EXAMPLE 9

As a starting material, poly(ethylene terephthalate) resin pellets (70 wt %) having an intrinsic viscosity of 0.64, polystyrene resin pellets (3 wt %, TOPOREX 570-57U, manufactured by MITSUI TOATSU CHEMICALS, INC.) having a melt flow rate of 2.0, polypropylene resin pellets (6 wt %, NOBLEN FO-50F, manufactured by MITSUI TOATSU CHEMICALS, INC.) having a melt flow rate of 1.7, and polymethylpentene resin pellets (21 wt %, TPX, RT-18, manufactured by Mitsui Chemicals Inc.) having a melt flow rate of 8 were mixed and supplied to a twin-screw extruder. The mixture was thoroughly kneaded. Strands were cast in water for cooling and cut with a strand cutter to give master pellets containing a void-forming agent.

The obtained master pellets were dried with hot air (170° C.×3 hours). Thereto were added master pellets (43 wt %), poly(ethylene terephthalate) resin (55 wt %) having an intrinsic viscosity of 0.62 which had been dried with hot air in the same manner, and anatase titanium dioxide (2 wt %, TA-300, manufactured by Fuji Titanium Inc.) having an average particle size of 0.3 $\mu$m (electron microscope method) to give a starting material of the film.

These starting materials were supplied to a twin-screw extruder and kneaded. Using a T die, the mixture was extruded on a cooling drum adjusted to 30° C. to give an unoriented sheet having a thickness of about 650 $\mu$m. The obtained unoriented sheet was heated to 86° C. with a heating roll, and longitudinally drawn 3.4 times between rolls. The stretched film was heated on a tenter to 120° C. and transversely drawn 3.7 times. The film was tentered, heated at 230° C. for 5 seconds and relaxed by 4% in the transverse direction at 220° C. to give a porous polyester film having a thickness of 75$\mu$m (Example 1).

EXAMPLE 10

Comparative Examples 12–14

In the same manner as in Example 9 except that the compositions of master pellets and the film were changed to those recited in Tables 3 and 4 and the thickness of the unoriented sheet was adjusted to make the thickness of the film after biaxial orientation 75 $\mu$m, a film was prepared.

Comparative Example 15

Poly(ethylene glycol) (15 wt %) having a molecular weight of 8000 was added during the step for producing polyester, namely, before condensation polymerization following ester exchange reaction to give a polyethylene terephthalate) polyether copolymer having an intrinsic viscosity of 0.83. The obtained chips were dried with hot air (170° C.×3 hours), and polymethylpentene chips (10 wt %, TPX, RT-18, manufactured by Mitsui Chemicals Inc.) having a melt flow rate of 26 were added to give a starting material of the film.

In the same manner as in Example 9 and using this starting material except that the thickness of the unoriented sheet was adjusted so that the thickness of the film after biaxial orientation became 75 $\mu$m, a film was prepared.

EXAMPLE 11,

Comparative Example 16

Part of the films obtained in Example 9 and Comparative Example 15 was pulverized and fed into a vent-type twin-screw extruder to prepare self-reclaimed pellets. The obtained pellets were used in a proportion of 30 wt % and the remaining 70 wt % consisted of the materials in the same composition ratios as in Example 9 and Comparative Example 15. In the same manner as in Example 9 and Comparative Example 15 except that the self-reclaimed resin thus obtained was used in a proportion of 30 wt % and the thickness of the unoriented sheet was adjusted so that the thickness of the film after biaxial orientation became 75 $\mu$m, the films of Example 11 and Comparative Example 16 were prepared. Since the film of Comparative Example 16 suffered from frequent film breakage upon transverse drawing under the same drawing conditions as in Comparative Example 12, the transverse draw ratio reduced to 2.5.

EXAMPLE 12

The material used in Example 9 was used as the starting material of the film core layer, and a mixture of poly (ethylene terephthalate) resin (65 wt %) having an intrinsic viscosity of 0.64 and anatase titanium dioxide (35 wt %, TA-300, manufactured by Fuji Titanium Inc.) was used as the starting material of layer (B). The core layer material was fed into a twin-screw extruder. The mixed starting material of layer (B) was fed into a vent-type twin-screw extruder. Using a feed block, layer (B) was bonded to the both surfaces of the core layer. In so doing, the discharge amount was adjusted with a gear pump so that the volume ratio of layer (B) to core layer material became 1:9. Using a T die, the mixture was extruded on a cooling drum adjusted to 30° C. to give an unoriented sheet having a thickness of about 630 $\mu$m. In the same manner as in Example 9, a porous polyester film having layer (B) was obtained.

The properties of the films thus obtained are shown in Table 5. The film of Comparative Example 16 had a great degree of cissing due to the reduced draw ratio. Thus, specific gravity and flexibility could not be determined in a dependable manner. For this reason, Table 5 lacks evaluation of this film. The compositions of master pellets are shown in Table 3 and the compositions of the films are shown in Table 4.

TABLE 3

| | Composition of master pellets | | | |
|---|---|---|---|---|
| | PET | PS | PP | PMP |
| MP-1 | 70 wt % (IV = 0.64) | 3 wt % (MI = 2.0) | 6 wt % (MI = 1.7) | 21 wt % (MI = 8) |
| MP-2 | — | 20 wt % (MI = 2.0) | 20 wt % (MI = 1.7) | 60 wt % (MI = 8) |
| MP-3 | — | 60 wt % (MI = 2.0) | — | 40 wt % (MI = 8) |
| MP-4 | — | 20 wt % (MI = 2.0) | — | 80 wt % (MI = 8) |
| MP-5 | — | 20 wt % (MI = 2.0) | 50 wt % (MI = 1.7) | 30 wt % (MI = 8) |

TABLE 4

| | Composition of films | | |
|---|---|---|---|
| | PET (IV = 0.64) | Master pellet | Others |
| Example 9 | 55 wt % | MP1 = 43 wt % m | TiO$_2$ = 2 wt % |
| Example 10 | 80 wt % | MP2 = 13 wt % m | TiO$_2$ = 7 wt % |
| Comp. Ex. 12 | 85 wt % | MP3 = 13 wt % m | TiO$_2$ = 2 wt % |
| Comp. Ex. 13 | 85 wt % | MP4 = 13 wt % m | TiO$_2$ = 2 wt % |
| Comp. Ex. 14 | 85 wt % | MP5 = 13 wt % m | TiO$_2$ = 2 wt % |

TABLE 5

|  | Specific gravity | Flexibility (wrinkles) | Color b value | Surface state | Film production |
|---|---|---|---|---|---|
| Example 9 | 0.94 | A | −0.2 | uniform | Stable, Roll stained |
| Example 10 | 0.98 | A | 0.2 | uniform | Stable, Roll stained |
| Com. Ex. 12 | 1.21 | A | −0.2 | uniform | Stable, Roll stained |
| Com. Ex. 13 | 0.98 | C | 0.1 | Canvas-like cissing | Many breaks, Roll stained |
| Com. Ex. 14 | 1.22 | A | −0.1 | Uniform | Stable, roll highly stained |
| Com. Ex. 15 | 0.99 | C | 3.2 | Canvas-like cissing | Many breaks, roll highly stained |
| Example 11 | 0.92 | A | 0.3 | Uniform | Stable, Roll stained |
| Com. Ex. 16 | Marked cissing, Evaluation not possible | | 5.6 | Canvas-like cissing | Many breaks, Unstable, Stain unknown |
| Example 12 | 0.93 | A | 0.3 | Uniform | Stable, roll not stained |

From the results of Table 5, the following analysis is possible. In Examples 9 and 10, sufficient flexibility was achieved irrespective of low specific gravity, and the color was fine and the surface was stable and uniform. In Example 11 wherein self-reclaimed resin was used in a great amount, color and film-forming stability were maintained, thus demonstrating superior properties.

In contrast, when polypropylene resin was not contained at all, the film could not have low specific gravity (Comparative Example 12) or the film showed poor uniformity of film surface and insufficient flexibility (Comparative Example 13).

In Comparative Example 14 wherein the mixing ratio of polypropylene resin was greater than the level defined in the present invention, the film could not have low specific gravity.

When the polymethylpentene resin and polyether were concurrently used as in conventional methods, flexibility was poor and the surface showed insufficient uniformity (Comparative Example 15). When self-reclaimed resin was used in Comparative Example 16, the film-forming property was profoundly degraded, and so were various other properties.

Moreover, the film of Example 12 having layer (B) and satisfying the requirements of the present invention successfully achieved the desired effect and showed less contamination during film production. Thus, the porous polyester film of the present invention is excellent in lightweight property, flexibility, color, uniform surface state and productivity.

This application is based on application Nos. 151230/1997, 187978/1997, 877/1998 and 43856/1998 filed in Japan, the contents of which are incorporated hereinto by reference.

What is claimed is:

1. A porous polyester film comprising a polyester and a thermoplastic resin incompatible with said polyester, which film has an apparent specific gravity of not more than 1.3, a dynamic hardness of one of the surfaces thereof of not more than 5.0 and a surface gloss of not less than 20%.

2. A thermal transfer image-receiving sheet comprising a recording layer for receiving ink transferred from a thermal transfer ink sheet formed on a porous polyester film, wherein the porous polyester film comprises a polyester and a thermoplastic resin incompatible with said polyester, which film has an apparent specific gravity of not more than 1.3, a dynamic hardness of one of the surfaces thereof of not more than 5.0 and a surface gloss of not less than 20%.

3. The thermal transfer image-receiving sheet of claim 2, which has a surface gloss that is not less than 50%.

4. The thermal transfer image-receiving sheet of claim 2, which has an optical image density that is not less than 100%.

5. A porous polyester film comprising a polyester and a thermoplastic resin incompatible with said polyester, which film has an apparent specific gravity of not more than 1.3, a dynamic hardness of one of the surfaces thereof of not more than 5.0 and a surface gloss of not less than 20%, and which is obtained by subjecting a polymer mixture of the polyester and the thermoplastic resin incompatible with said polyester to biaxial orientation and heat treatment, wherein the thermoplastic resin incompatible with polyester includes polystyrene resin, polymethylpentene resin and polypropylene resin, and a polystyrene resin content (X wt %), a polymethylpentene resin content (Y wt %) and a polypropylene resin content (Z wt %) satisfy the following equations:

$$0.01 \leq X/(Y+Z) \leq 1$$

$$Z/Y \leq 1$$

$$3 \leq X+Y+Z \leq 30.$$

6. A thermal transfer image-receiving sheet comprising a recording layer for receiving ink transferred from a thermal transfer ink sheet formed on the porous polyester film of claim 5.

7. The thermal transfer image-receiving sheet of claim 6, which has a surface gloss that is not less than 50%.

8. The thermal transfer image-receiving sheet of claim 6, which has an optical image density that is not less than 100%.

9. A porous polyester film comprising a polyester and a thermoplastic resin incompatible with said polyester, which film has an apparent specific gravity of not more than 1.3, a dynamic hardness of one of the surfaces thereof of not more than 5.0 and a surface gloss of not less than 20%, and one of the surfaces of the porous polyester film having a cohesive failure index of not more than 3.

10. A thermal transfer image-receiving sheet comprising a recording layer for receiving ink transferred from a thermal transfer ink sheet formed on the porous polyester film of claim 9.

11. The thermal transfer image-receiving sheet of claim 10, which has a surface gloss that is not less than 50%.

12. The thermal transfer image-receiving sheet of claim 10, which has an optical image density that is not less than 100%.

* * * * *

UNITED STATES PATENT AND TRADEMARK OFFICE
CERTIFICATE OF CORRECTION

PATENT NO. : 6,383,983 B1
DATED : May 7, 2002
INVENTOR(S) : Sasaki et al.

It is certified that error appears in the above-identified patent and that said Letters Patent is hereby corrected as shown below:

Column 13,
Line 12, "thickness T" should read -- thickness t --.
Line 13, "taken as W" should read -- taken as w --.

Signed and Sealed this

First Day of October, 2002

Attest:

Attesting Officer

JAMES E. ROGAN
Director of the United States Patent and Trademark Office